Jan. 21, 1969 J. E. MARTENS 3,422,574
VEHICLE QUARTER WINDOW ARRANGEMENT
Filed Nov. 30, 1967 Sheet 1 of 2
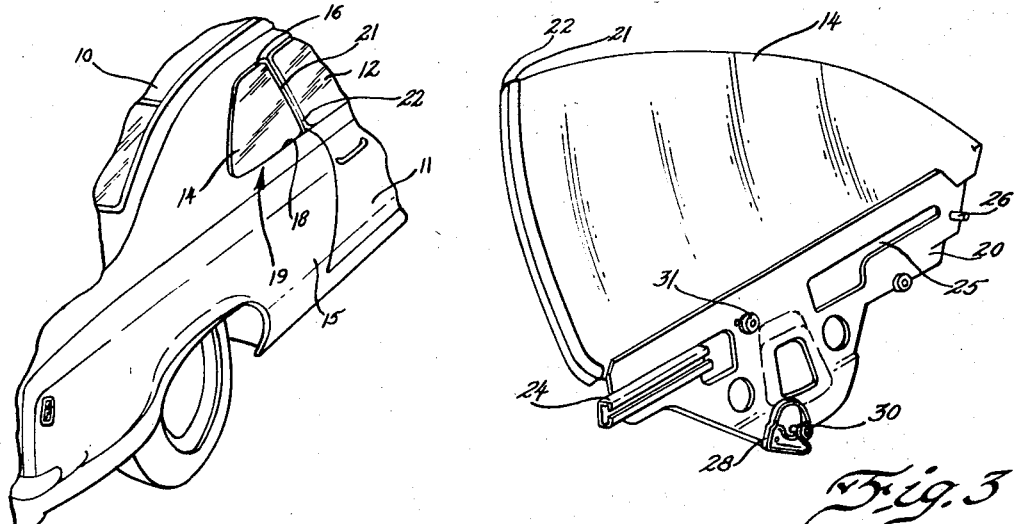
Fig. 3
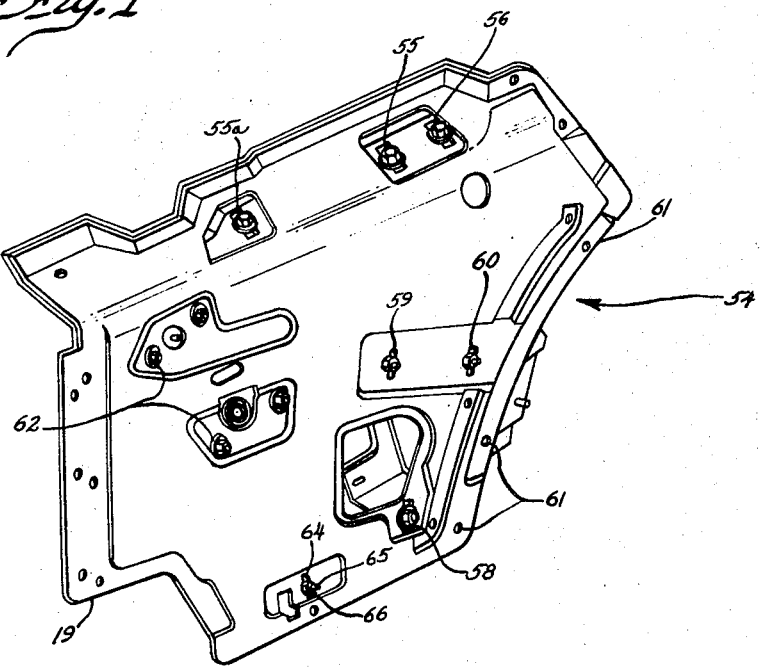
Fig. 1
Fig. 2
INVENTOR.
JACK E. MARTENS
BY
Barbee & Latta
ATTORNEYS Jan. 21, 1969 J. E. MARTENS 3,422,574
VEHICLE QUARTER WINDOW ARRANGEMENT
Filed Nov. 30, 1967 Sheet 2 of 2
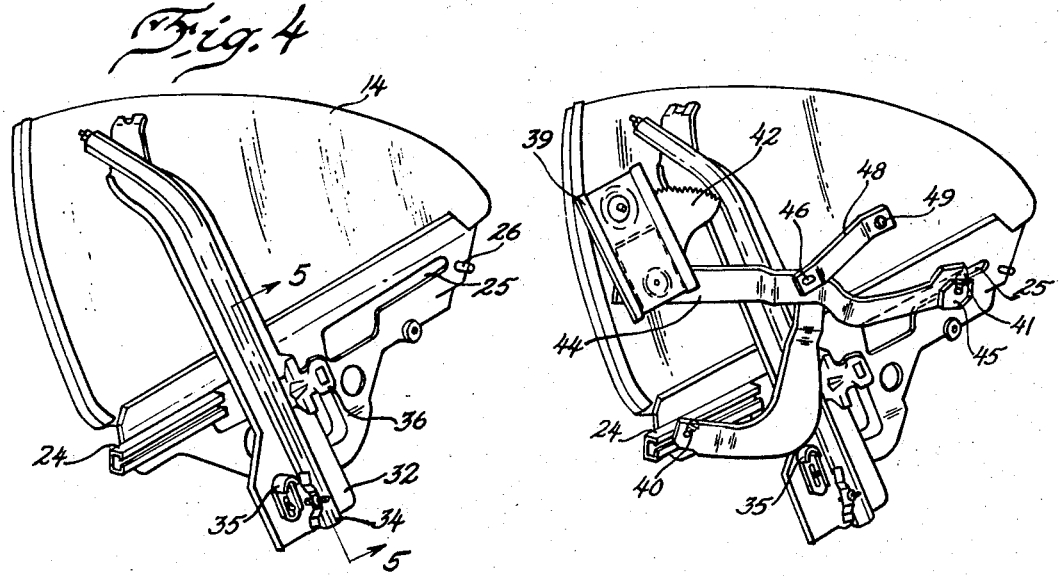
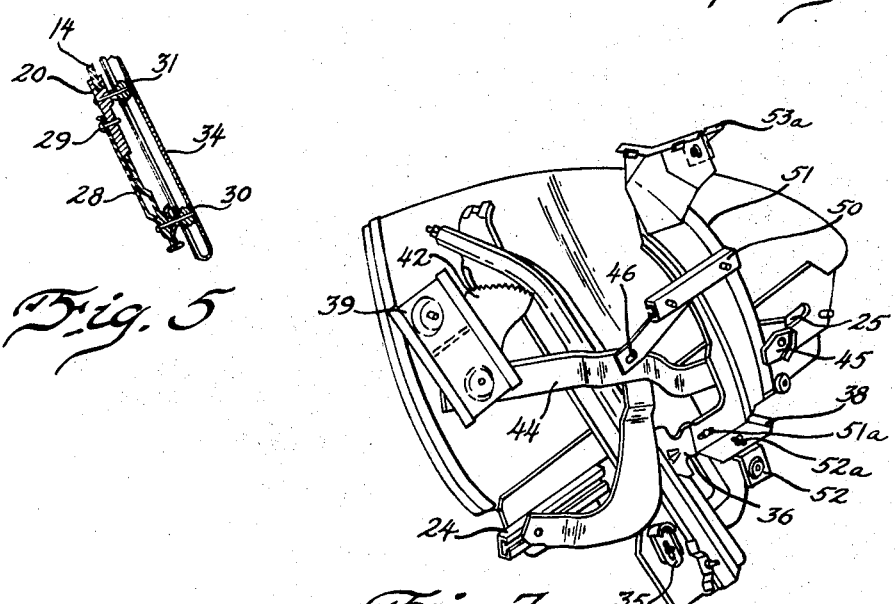
INVENTOR.
JACK E. MARTENS
BY
Barber & Latta
ATTORNEYS

United States Patent Office 3,422,574
Patented Jan. 21, 1969

3,422,574
VEHICLE QUARTER WINDOW ARRANGEMENT
Jack E. Martens, Bloomfield Hills, Mich., assignor to American Motors Corporation, Kenosha, Wis., a corporation of Maryland
Filed Nov. 30, 1967, Ser. No. 687,058
U.S. Cl. 49—351           10 Claims
Int. Cl. E05f *11/44;* E05f *11/52*

ABSTRACT OF THE DISCLOSURE

An arrangement including a support panel, a pair of guide members mounted on the panel, a window regulator mechanism mounted on the panel, and a window interconnected between the regulator mechanism and one of the guide members for movement between an open and closed position.

BACKGROUND OF THE INVENTION

*Field of the invention*

This invention pertains to a hardtop type quarter window arrangement that is pre-assembled and installed as a unit in a vehicle.

*Description of the prior art*

The conventional, vehicle quarter window arrangement, includes a pair of guides separately mounted on the inside of the rear quarter outer panel. The window has an upper, centrally located roller that moves down the front guide channel as the window is lowered. To provide lateral stability in the semi-lowered position, a stabilizer having a roller mounted therein is pivotally attached to the window below the window roller. The stabilizer roller also moves up and down the front guide channel. Attached to the rear of the window is another roller or glide that contacts the rear guide. A window regulator mechanism having a pair of scissors arms is mounted on the side of the inner quarter panel remote from the passenger compartment. Each arm has a roller that moves in suitable front and rear channels of the window sash. Thus, by rotation of a crank extending into the passenger compartment, a pinion gear drives a gear segment attached to a regulator arm and thus opens and closes the scissors to pull the window down to the open window position or up to the closed position. The regulator mechanism usually only provides the force for the up and down motion to the window. Because of the rear wheel well, the guides, in addition to controlling the up and down window movement also control the necessary fore and aft movement during operation thereof. Suitable stops are provided to prevent overtravel of the window.

While the above detailed window arrangement has been utilized for many years, it is difficult and time consuming to install. Further, adjustment of the guides at generally each end thereof along 3 axes: either up and down, fore and aft, and in and out, is frequently required to achieve window operation without binding and proper alignment when closed to prevent leakage.

SUMMARY OF THE INVENTION

Applicant has designed a quarter window arrangement that substantially avoids the problems of the prior art. Specifically, applicant has so constructed and arranged the components that they can be installed on the inner quarter panel in a basically pre-adjusted condition. The entire sub-assembly is then mounted on the vehicle as a unit. Of course, the accuracy of the mounting provisions on the vehicle for the panel must be closely maintained. Only a relatively few and minor window adjustments are required after the panel has been installed.

The procedure for the assembly of the quarter window arrangement is noted briefly below. The window and sash unit is placed on a table with the side facing toward the inside of the car, facing the worker. With the top roller and the stabilizer roller substantially aligned, the front guide member is placed over the window so that the rollers are in the guide channel. The front guide member is then moved downward until the bottom thereof extends 1″ below the stabilizer. The window regulator mechanism with the arms in the down position is then located over the window with the arm rollers in the sash channels. Since the regulator is unrestrained, as the rollers are free to move in the sash channels, the rear guide member is connected to the assembly by bolting same via a slotted hole to the front guide member and the shoe on the rear regulator arm is slidably mounted on the rear guide member. The roller on the other free regulator arm is then centered in the dead man channel. The panel is now ready for addition to the assembly, and the guide members and dead man channel are attached thereto with slotted holes. The regulator mechanism is attached to the panel by screws using ordinary holes. A jackscrew in the lower front guide member is provided for in and out adjustment of the assembled guide members. The panel has ordinary, rather than slotted holes, for attachment to the vehicle.

The adjustments required after the quarter window arrangement has been mounted on the vehicle and with the window in the up or closed position are as follows: the adjusting of the window to match the adjacent door window, the roof rail weather strip, and the outer belt weatherstrip. Moving the dead man channel up or down in the generally vertical panel slots aligns the window with the door window. The height of the window in relation to the roof rail weather strip is achieved by moving the bottom of the front guide member fore or aft in relation to the second guide member. To match the window to the outer belt weather strip requires moving the combined guide members outward via the upper slotted panel holes and the bottom slotted hole until the window contacts the belt weather strip. The most critical adjustment is the adjusting of the window to the roof rail weather strip for tightness to prevent leakage. It is to be remembered that the window does not have a chrome border to give same rigidity as in the past. Applicant achieves this adjustment by use of the jackscrew attached to the panel and the front guide member. By turning the screw, the lower part of the entire guide assembly can be moved outboard which in turn causes the window sash to move outward. Inasmuch as the window is already against the belt line weather strip, the window pivots thereabout, forcing the top of the window tightly against the roof rail weather strip to prevent leakage. Another effect of this action is to take up clearance between the arm rollers of the regulator mechanism located on the panel and the sash channels to eliminate noise therebetween. Applicant has also utilized the flexibility of the regulator arms by placing them under tension, to provide a relatively large jackscrew in and out adjustment particularly necessary on "personal type vehicles" without further adjustment of the regulator mechanism itself.

While conceivably various arrangements could be devised that would achieve the advantages of applicant's window arrangement, it is felt that the applicant has provided a unique design that substantially solves a long standing problem in a straight-forward and yet economical manner.

It is, therefore, an object of this invention to provide a new and improved quarter window arrangement for a vehicle.

Another object of this invention is to provide a quarter window arrangement that may be pre-assembled and installed as a unit on a vehicle.

Another object of this invention is to reduce the adjusting procedure required for proper window operation.

Another object of this invention is to provide a relatively large in and out adjustment of the window, to effect a tight seal between the unbordered window and the vehicle without adjustment of the window regulator mechanism.

BRIEF DESCRIPTION OF THE DRAWINGS

FIGURE 1 is a partial perspective view of the right rear of a hardtop-type vehicle showing the quarter window arrangement of this invention in place, with the window in the up position;

FIGURE 2 is a perspective view of the quarter window arrangement in the window down position taken from the side facing the interior of the vehicle but prior to installation therein;

FIGURE 3 is a perspective view of the window and sash sub-assembly in the position it would assume when placed on a work table at the start of assembly;

FIGURE 4 is a perspective view of the assembly of the window and the first guide member;

FIGURE 5 is a section taken along line 5—5 of FIGURE 4;

FIGURE 6 is a perspective view of the window regulator mechanism joined to the assembly of FIGURE 4; and FIGURE 7 is a perspective view of the rear guide member in place on the assembly of FIGURE 5, and prior to the addition of the panel shown in FIGURE 2.

DESCRIPTION OF THE PREFERRED EMBODIMENT

Referring to FIGURE 1, 10 indicates a hardtop type vehicle. Vehicle 10 has a door 11 with a window 12 located therein. Window 12 does not have a chrome border either at the top or rear where it joins the quarter window 14. Vehicle 10 has a rear quarter outer panel 15 and a roof rail weather strip 16. The vehicle opening for the quarter window has an outer belt weatherstrip 18 for contact by window 14 when in the up position as shown. Door 11 also has a similar belt weather strip.

Quarter window 14 is an element of quarter window arrangement 19. As best shown in FIGURES 3 through 7, arrangement 19 includes window 14 fixedly mounted in window sash 20. Window 14 has a chrome channel 21 fixedly attached to the forward portion of the window. Channel 21 also has a rubber seal 22 integral therewith for contact by the rear portion of door window 12 to seal same. Sash 20, which encloses the bottom portion of window 14, has a front sash channel 24 attached thereto and a rear, cut out passage 25. Passage 25 could also be a channel. Peg 26 attached to the rear portion of window sash 20 serves as a travel limit in the window up position in conjunction with suitable construction located on the inner quarter panel.

Stabilizer member 28 is rotatably attached to sash 20 via rivet 29. Stabilizer 28 has a roller 30 rotatably mounted thereon located below roller 31 rotatably mounted on sash 20. Stabilizer 28 provides lateral restraint to window 14 and sash 20 associated therewith when window is in the partially lowered position. Stabilizer 28 also aids, by providing the necessary moment arm to the front guide member in the adjustment of the top of window 14 to roof rail weatherstrip 16 as will be detailed hereafter.

Front guide member 32 as shown best in FIGURES 4 and 5 is mounted on the window and sash combination so that rollers 30 and 31 lie in channel 34 of guide member 32. Down stop 35 is attached to guide member 32 via a vertically slotted hole. Guide member 32 also has mounting portion 36 which is adapted for attachment to rear guide member 38.

As shown in FIGURE 6, conventional window regulator mechanism 39 is located on the sash and window combination so that rollers 40 and 41 lie in channel 24 and cut out passage 25 respectively. Mechanism 39 (shown in the down position) consists of pinion gear (not shown) for driving segment gear 42. Gear 42 is connected to arm 44. Arm 44 has roller 41 and shoe 45 located on the end remote from gear 42. Connected to arm 44 via rectangular rivet 46 in scissors fashion is two-piece arm 48. Arm 48 has roller 40 on one end and roller 49 on the other end.

As shown in FIGURE 7, roller 49 is located in dead man channel 50 in the central part thereof. Rear guide member 51 is attached by a bolt or the like to front guide member 32 at mounting portion 36 via a horizontally slotted hole 51a for movement therebetween. Shoe 45, defining a channel, is slidably mounted on rear guide member 51. Rear guide member 51 also has a bracket 52 attached thereto by a bolt via a slotted hole 52a for in and out movement relative thereto. At the top of rear guide member 51 is upper stop 53a attached thereto by a vertically slotted hole.

Referring to FIGURE 2, inner quarter panel 54 is attached to the above noted items with upper in and out slotted holes 55a, 55 and 56 and lower vertically slotted hole 58 for bracket 52 mounted on rear guide member 51. Vertically slotted holes 59 and 60, in panel 54 are utilized for connection to dead man channel 50. Ordinary holes 61 around the periphery of panel 54 are utilized for attachment by screws of the assembled quarter window arrangement 19 to vehicle 10. Holes 62 are utilized to connect mechanism 39 to panel 54. Panel 54 also has a vertically slotted hole 64 for jackscrew 65 and nut 66 mounted on front guide member 32. Jackscrew 65 allows in and out movement of threaded lower portion of front guide member 32 relative to panel 54.

The step by step assembly of the quarter window arrangement prior to installation on the vehicle has been detailed previously and same is also clearly apparent from a perusal of FIGURES 3, 4, 5, 6, 7 and the assembly drawing thereof as shown in FIGURE 2.

The adjustment of the vehicle quarter window arrangement 19 after assembly to the vehicle 10 via screws in holes 61 in panel 54 and matching threaded holes in vehicle 10 will now be detailed.

As mentioned briefly above, the first step is the aligning of the window 14 of arrangement 19 so that chrome channel 21 and rubber seal 22 are parallel to the adjacent edge of door glass 12 when both are in the up position. This is accomplished by moving the dead man channel 50 down in slotted holes 59 and 60 to move the top front window 14 corner rearward and up. Moving the channel up will move the top front corner forward and down. It is to be noted that after the pre-assembly of the window arrangement 19, the screws in panel 54 are tightened for the window regulator and the remainder are only semi-tightened so that the items will remain in place on panel 54 during installation but can be moved by a sharp blow during the adjustment process.

The quarter window after the parallel gap has been established with the door window must then be adjusted regarding height in conjunction with the roof rail weatherstrip. This is accomplished by moving front guide member 32 fore or aft via slotted hole 51a in rear guide member 38. An opening is provided in panel 54 for access to holes 51a and 52a. If moved aft rolling the window up will increase the height. A reverse procedure will lower the window.

The quarter window 14 must also be fitted to the outer belt weatherstrip 18. This is accomplished by moving the combined front guide member 32 and the rear guide member 51 outward via lower slotted hole 52a in rear guide member and the upper slotted holes 55, 55a and 56 until the belt weatherstrip is contacted.

With the window 14 adjusted as noted above, the upper stop 53a is located to contact peg 26 and tightened to restrain movement in its vertical slot. An upper stop may also be provided in channel 34 of front guide member 32.

The adjustment of the window 14 to roof rail weather strip to prevent leakage remains. This is accomplished by use of jackscrew 65. By turning the screw out, the lower part of the assembly of front guide member 32 and rear guide member 51 also moves outward. Thus the lower part of window 14 is also moved outward due to the location of rollers 30 and 31 in channel 34. Stabilizer 28 ensures that the sash will move as unit. Inasmuch as the sash is already against belt strip 18 the window pivots thereabout and the top of the window 14 is forced tightly against the roof rail weather strip 16 to prevent leakage therebetween. Turning the jackscrew 65 in the other direction would produce a contrary result. It is to be noted that arms 40 and 48 may be placed under tension, thereby removing clearance between rollers 40 and 41 and sash channel 24 and cut out pasage 25 without adjustment of the regulator mechanism. Although rear guide channel 51 is moved outward, it is only the bottom thereof. Therefore, shoe 45 is drawn tightly also to rear guide member 51 placing composite arm 44 under tension. Also, due to the flexibility of the unbordered glass, the glass must be rigidly bonded to sash 20 unlike in the past where same was connected by a rubber seal and a flexible metal clip. For further rigidity, if required, window 14 could have an irregular, peripheral border for attachment to sash 20 to give an increased surface.

With the adjustment made as above, the bolts in holes 55, 55a, 56, 59 and 60 are tightened securely. The window is then rolled down and the bolts in slots 51a and 52a are tightened along with bolt in slot 58 and down stop 35 positioned to contact arm 48 and the bolt tightened. The exterior trim and hardware can now be installed.

The adjusting procedure detailed need not be performed in its entirety except in the unlikely possibility that all components are in a misaligned condition. Also, due to the design of the structures involved, the action taken and results achieved are according to plan and produce an orderly procedure with considerable savings in time and a satisfactory, uniform result.

Having thus described the invention, it will be apparent to those skilled in the art that various modifications and changes can be made without departing from the spirit of the invention or the scope of the appended claims.

I claim:

1. A quarter window arrangement for a vehicle comprising:
    (a) a support panel, said panel being adapted to be mounted on the vehicle;
    (b) a first guide member mounted on said panel, said member having a guide channel;
    (c) a second guide member connected to said first guide member and mounted on said panel;
    (d) a window regulator mechanism mounted on said panel, said mechanism having a pair of scissors connected arms, one of said pair of arms having a roller and a shoe mounted thereon, said shoe defining a channel, said other arm having a pair of spaced rollers mounted thereon;
    (e) a dead man channel mounted on said panel, said channel mounting for movement therein, one of said pair of rollers of said other arm; and
    (f) a window and sash assembly having a pair of spaced channel type means located in said sash, said window sash also having a roller mounted thereon, said sash roller being located in said guide channel of said first guide member, said other roller of said other arm being located in one of said sash means, said roller of said one arm being located in the other of said sash means, said shoe channel engaging therein said second guide member, said mechanism being adapted to move said window to an up or down position on the vehicle with the path of window travel being basically determined by said sash roller in conjunction with said first guide member channel and the shoe of said one arm and the second guide member.

2. The quarter window arrangement of claim 1 further comprising:
    a stabilizer member pivotally mounted on said window sash and extending below said sash, said stabilizer member having a roller extending into said first guide member channel.

3. The quarter window arrangement of claim 2 further comprising:
    a first stop means mounted on said first guide member, said stop means being adapted to be contacted by said other arm to provide a limit to downward travel of said window.

4. The quarter window arrangement of claim 3 further comprising:
    a second stop means mounted on said second guide member, said second stop means being adapted to be contacted by said sash to provide a limit to upward travel of said window.

5. A quarter window arrangement for a vehicle comprising:
    (a) a support panel, said panel being adapted to be mounted on the vehicle;
    (b) a first guide member mounted on said panel, said member having a guide channel;
    (c) a second guide member connected to said first guide member and mounted on said panel;
    (d) a window regulator mechanism mounted on said panel, said mechanism having a pair of scissors connected arms, one of said pair of arms having a roller and a shoe mounted thereon, said shoe defining a channel, said other arm having a pair of spaced rollers mounted thereon;
    (e) a dead man channel mounted on said panel, said channel mounting for movement therein, one of said pair of rollers of said other arm;
    (f) a stabilizer member pivotally mounted on said window sash and extending below said sash, said stabilizer member having a roller extending into said first guide member channel; and
    (g) means for adjusting said dead man channel, said first and said second guide members relative to said panel; and
    (h) a window and sash assembly having a pair of channel type means located in said sash, said window sash also having a roller mounted thereon, said sash roller being located in said guide channel of said first guide member, said other roller of said other arm being located in one of said sash means, said roller of said one arm being located in the other of said sash means, said shoe channel engaging therein said second guide member, said mechanism being adapted to move said window to an up or down position on the vehicle with the path of window travel being basically determined by said sash roller in conjunction with said first guide member channel and the shoe of said one arm and the second guide member.

6. The quarter window arrangement of claim 5 in which the means for the dead man adjustment is accomplished by providing the panel with generally vertical, slotted holes for the mounting thereon of the dead man channel.

7. The quarter window arrangement of claim 6 in which the means for the adjustment of said first guide member to said second guide member and therefore said panel is provided by a slotted hole in the second member which allows fore and aft movement of said first guide member.

8. Th quarter window arrangement of claim 7 in which the means for the in and out adjustment of said second guide member and first guide member to said panel is provided by a lower, slotted hole in said second member, and said first guide member and said second guide member are also adjustable in and out by upper slotted holes in said panel.

9. The quarter window arrangement of claim 8 in which the means for the lower in and out adjustment of said first guide member and said second guide member is provided in regard to said panel by a jackscrew extending between said panel and said first guide member, outward movement of said jackscrew being adapted to place said regulator arms under tension and to draw the arm rollers tightly to the sash channel means without adjustment of said mechanism.

10. The quarter window arrangement of claim 9 further comprising: a first stop means mounted on said first guide member, said stop means being adjustable vertically and being adapted to be contacted by said other arm to provide a limit to downward travel of said window and a second stop means mounted on said second guide member, said second stop means being adjustable vertically and being adapted to be contacted by said sash to provide a limit to upward travel of said window.

References Cited

UNITED STATES PATENTS

| 2,746,747 | 5/1956 | Lautenbach | 49—227 |
| 2,803,492 | 8/1957 | Wright | 49—227 |
| 2,902,277 | 9/1959 | Hedeen | 49—227 |
| 2,998,246 | 8/1961 | Probst | 49—227 |

FOREIGN PATENTS 913,073  12/1962  Great Britain.

DAVID J. WILLIAMOWSKY, *Primary Examiner.*

J. KARL BELL, *Assistant Examiner.*

U.S. Cl. X.R.

49—227